United States Patent
Mutter et al.

(10) Patent No.: US 11,700,143 B2
(45) Date of Patent: **\*Jul. 11, 2023**

(54) USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 118 days.

This patent is subject to a terminal disclaimer.

(21) Appl. No.: 17/311,166

(22) PCT Filed: Dec. 17, 2019

(86) PCT No.: PCT/EP2019/085611
§ 371 (c)(1),
(2) Date: Aug. 10, 2021

(87) PCT Pub. No.: WO2020/127235
PCT Pub. Date: Jun. 25, 2020

(65) Prior Publication Data
US 2021/0377071 A1      Dec. 2, 2021

(30) Foreign Application Priority Data
Dec. 17, 2018   (DE) .................... 10 2018 221 961.3

(51) Int. Cl.
*H04L 12/40* (2006.01)
*H04L 12/46* (2006.01)
*H04L 69/324* (2022.01)

(52) U.S. Cl.
CPC .... *H04L 12/40013* (2013.01); *H04L 12/4604* (2013.01); *H04L 12/4641* (2013.01); *H04L 69/324* (2013.01); *H04L 2012/40215* (2013.01)

(58) Field of Classification Search
CPC ........... H04L 12/40013; H04L 12/4604; H04L 12/46211; H04L 69/324
See application file for complete search history.

(56) References Cited

U.S. PATENT DOCUMENTS 6,052,753 A    4/2000  Doerenberg et al.
8,819,466 B2 * 8/2014  Hartwich .......... H04L 12/40039
                                                    713/323

(Continued)

FOREIGN PATENT DOCUMENTS

DE  102009026965 A1  12/2010
DE  102015209201 A1  3/2016

OTHER PUBLICATIONS

International Search Report PCT/EP2019/085611 dated Feb. 20, 2020.

*Primary Examiner* — Henry Tsai
*Assistant Examiner* — Christopher A Daley
(74) *Attorney, Agent, or Firm* — Norton Rose Fulbright US LLP; Gerard Messina (57) ABSTRACT

A user station for a serial bus system. The user station includes a communication control device for controlling a communication of the user station with at least one other user station, and a transceiver device for transmitting a transmission signal, generated by the communication control device, onto a bus, so that for a message that is exchanged between user stations of the bus system, the bit time of a signal transmitted onto the bus in the first communication phase is different from a bit time of a signal transmitted in the second communication phase. The communication control device generates the transmission signal (Continued)

according to a frame in which a field for a header check sum and a field for a frame check sum are provided, and computers the header check sum from all bits in the header of a frame that is formed for the message, except fixed stuff bits.

12 Claims, 6 Drawing Sheets

(56) References Cited

U.S. PATENT DOCUMENTS

| | | | |
|---|---|---|---|
| 8,989,210 B2* | 3/2015 | Hartwich | H04L 12/40039 |
| | | | 370/458 |
| 9,258,244 B1 | 2/2016 | Boyd et al. | |
| 11,487,687 B2* | 11/2022 | Mutter | H04L 25/0264 |
| 11,489,694 B2* | 11/2022 | Mutter | H04L 12/40097 |
| 2003/0141987 A1 | 7/2003 | Hayes | |
| 2009/0213915 A1* | 8/2009 | Wagner | H04L 12/12 |
| | | | 375/220 |
| 2012/0210154 A1* | 8/2012 | Hartwich | H04L 12/40039 |
| | | | 713/323 |
| 2017/0147812 A1 | 5/2017 | Ujiie et al. | |
| 2017/0262400 A1 | 9/2017 | Hartwich et al. | |
| 2018/0205572 A1* | 7/2018 | Kishigami | H04L 25/0272 |
| 2020/0195239 A1* | 6/2020 | Wang | H03K 3/017 |

* cited by examiner

USER STATION FOR A SERIAL BUS SYSTEM, AND METHOD FOR COMMUNICATING IN A SERIAL BUS SYSTEM

FIELD

The present invention relates to a user station for a serial bus system, and a method for communicating in a serial bus system that operates with a high data rate and a high level of error robustness.

BACKGROUND INFORMATION

For the communication between sensors and control units, for example in vehicles, a bus system is frequently preferred instead of a point-to-point connection. With the increasing number of functions of a technical facility or of a vehicle, the data traffic in the bus system also increases. Moreover, there is a continual requirement for the data to be transmitted from the transmitter to the receiver more quickly than previously.

At the present time, in vehicles a bus system is used in the introduction phase, in which data are transmitted as messages under the ISO 11898-1:2015 standard, as a CAN protocol specification with CAN FD. The messages are transmitted between the bus users of the bus system, such as the sensor, control unit, transducer, etc.

In CAN FD, one of the advantages is that the length of a frame that is transmitted via the bus is dynamically changeable. Among other things, this is due to the fact that the length of the data field for transmitting the useful data does not always have to be equal to the maximum possible length of 64 bytes, but instead may be appropriately shortened when there are fewer useful data to be transmitted. As a result, the bus is blocked for no longer than necessary by one of the messages to be transmitted.

Therefore, in CAN FD the variable data field length is indicated in a DLC field. If a bit error occurs here, the receiver may decode an incorrect frame length, and therefore checks the check sum (cyclic redundancy check (CRC)) at the wrong location. It is then a matter of luck as to whether an error is detected based on the check sum (CRC error).

Another reason for the dynamically changing length of a CAN FD frame involves a bit stuffing rule. According to this rule, after five identical bits a bit inverse thereto is to be inserted into a CAN FD message. Therefore, in the field for the check sum (CRC field) a stuff bit counter is necessary in which the number of dynamically inserted stuff bits is entered. However, this stuff bit counter results in complexity and data overhead. As a result, the transmittable net data rate drops, which slows down the communication in the bus system.

SUMMARY

An object of the present invention is to provide a user station for a serial bus system, and a method for transmitting a message in a serial bus system, which solve the above-mentioned problems. In particular, example embodiments of the present invention provide a user station for a serial bus system, and a method for communicating in a serial bus system in which the disadvantages of the check sum safeguarding do not occur, so that a high data rate and an increase in the quantity of the useful data per frame may be achieved with great flexibility and with a high level of error robustness of the communication.

The object may be achieved by a user station for a serial bus system having the features of an example embodiment of the present invention. In accordance with an example embodiment of the present invention, the user station includes a communication control device for controlling a communication of the user station with at least one other user station of the bus system, and a transceiver device for transmitting a transmission signal, generated by the communication control device, onto a bus of the bus system, so that for a message that is exchanged between user stations of the bus system, the bit time of a signal transmitted onto the bus in the first communication phase is different from a bit time of a signal transmitted in the second communication phase, the communication control device being designed to generate the transmission signal according to a frame in which a field for a header check sum and a field for a frame check sum are provided, and the communication control device being designed to compute the header check sum from all bits in the header of a frame that is formed for the message, with the exception of fixed stuff bits that have been inserted into the header of the frame according to a fixed bit stuffing rule, according to which a fixed stuff bit is to be inserted after a fixed number of bits.

Due to the example embodiment of the user station, in a frame that is transmitted on the bus in order to exchange messages between the user stations of the bus system, a field containing the length of the frame is safeguarded. The correct length of the frame is thus always ensured. As a result, a receiver of the frame may always decode the correct frame length, and therefore may check the check sum (cyclic redundancy check (CRC)) at the end of the frame at the correct location. Errors in the communication in the bus system may thus be quickly and reliably detected. This means that the residual error probability is significantly decreased. The residual error probability indicates the probability of a frame being accepted as correct despite an error.

In addition, no stuff bit counter is necessary for safeguarding the length of the frame, carried out with the user station. This reduces the complexity of creating a frame in the transmitting user station, and reduces the complexity of evaluating a frame in a receiving user station, as well as the overhead of data to be transmitted. As a result, the transmittable net data rate increases, which speeds up the communication in the bus system.

As a result, by use of the user station, transmission and reception of the frames may be ensured with great flexibility with regard to instantaneous results during operation of the bus system and with a low error rate, even with an increased volume of useful data per frame.

By use of the user station in the bus system, it is thus possible in particular to maintain an arbitration known from CAN in a first communication phase and still increase the transmission rate considerably compared to CAN or CAN FD.

The method carried out by the user station may also be used when at least one CAN user station and/or at least one CAN FD user station that transmit(s) messages according to the CAN protocol and/or CAN FD protocol are/is present in the bus system.

Advantageous further embodiments of the user station are disclosed herein.

According to one particular embodiment variant of the present invention, the communication control device is designed to provide the header check sum in the transmission signal prior to a data field.

The communication control device is optionally designed to include the fixed stuff bits in the frame when computing the header check sum.

According to one exemplary embodiment, the communication control device is designed to compute the frame check sum from all bits that are situated in a frame, formed for the message, prior to the frame check sum, all fixed stuff bits that have been inserted into the frame according to a fixed bit stuffing rule, according to which a fixed stuff bit is to be inserted after a fixed number of bits, either being included or not included.

According to one variant, the communication control device is designed to compute the frame check sum from all bits that are situated in the field for the header check sum and in the data field of the frame that is formed for the message.

Alternatively, the communication control device may be designed to compute the frame check sum from all bits that are situated in the data field of the frame that is formed for the message.

According to one exemplary embodiment of the present invention, the frame that is formed for the message includes an additional field that is situated prior to the field for the header check sum, and the communication control device being designed to insert information concerning the number of dynamic stuff bits in the frame into the additional field.

The communication control device is possibly designed to configure the additional field as a field having a fixed length, in which the number of stuff bits, as information concerning the number of dynamic stuff bits, is inserted into the frame. Alternatively, the communication control device is possibly designed to select the length of the additional field as a function of how many dynamic stuff bits are inserted into the frame, so that the field for the header check sum is always expected after the same number of bits after the start of the frame on the bus.

The user station may also include a check sum unit for determining a starting value for computing the header check sum, in such a way that the temporary value of the header check sum up to the FDF bit cannot assume the value zero.

It is possible for the frame that is formed for the message to have a design that is compatible with CAN FD.

It is possible for the communication control device to be designed to generate the transmission signal according to a frame in which the field for a frame check sum is provided, but the field for the header check sum is not provided, and for the communication control device to be designed to apply a fixed bit stuffing rule in the entire frame, according to which a fixed stuff bit is to be inserted after a fixed number of bits.

Alternatively or additionally, the communication control device is optionally designed to provide an identifier in the frame which indicates the priority for transmitting the associated message onto the bus, the number of bits for the identifier being freely selectable.

Alternatively or additionally, the communication control device may be designed to provide an interval of 0 bit or 1 bit between successive frames in the transmission signal.

It is possible that in the first communication phase, it is negotiated which of the user stations of the bus system in the subsequent second communication phase obtains, at least temporarily, exclusive, collision-free access to the bus.

The user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system according to example embodiments of the present invention. The method is carried out with a user station of the bus system that includes a communication control device and a transceiver device. In accordance with an example embodiment of the present invention, the method includes the steps: controlling, via the communication control device, a communication of the user station with at least one other user station of the bus system, and transmitting, via the transceiver device, a transmission signal, generated by the communication control device, onto a bus of the bus system, so that for a message that is exchanged between user stations of the bus system, the bit time of a signal that is transmitted onto the bus in the first communication phase is different from a bit time of a signal that is transmitted in the second communication phase, the communication control device generating the transmission signal according to a frame in which a field for a header check sum and a field for a frame check sum are provided, and the communication control device computing the header check sum from all bits in the header of a frame that is formed for the message, with the exception of fixed stuff bits that have been inserted into the header of the frame according to a fixed bit stuffing rule, according to which a fixed stuff bit is to be inserted after a fixed number of bits.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

In FIG. 8 this aspect is illustrated based on the above-described first exemplary embodiment from FIG. 2. This aspect of the present invention may also be correspondingly applied to the second exemplary embodiment illustrated in FIG. 6, and the third exemplary embodiment illustrated in FIG. 7.

Unless stated otherwise, identical or functionally equivalent elements are provided with the same reference numerals in the figures.

DETAILED DESCRIPTION OF EXAMPLE EMBODIMENTS

Figure 1:
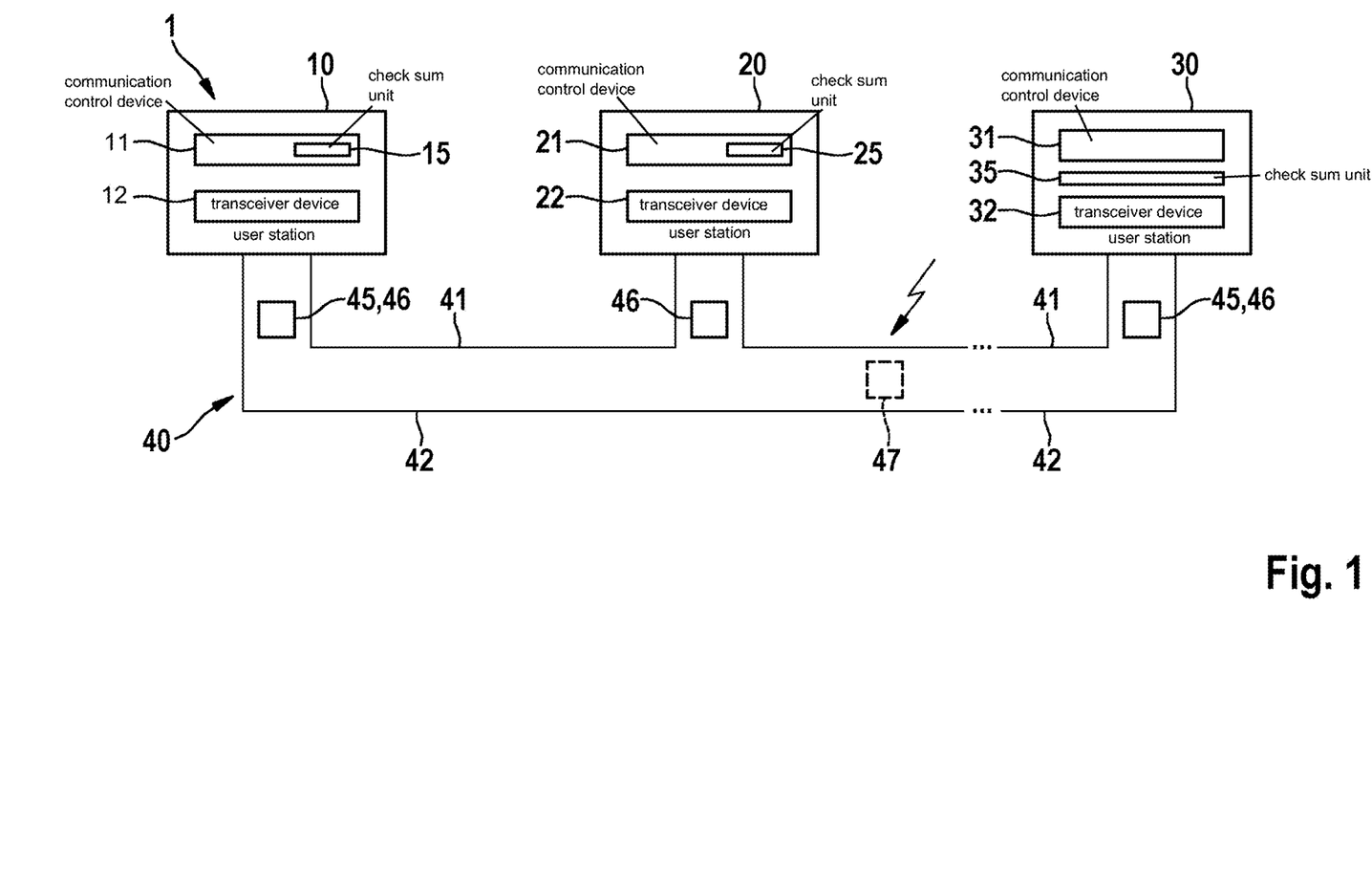
FIG. 1 shows a simplified block diagram of a bus system according to a first exemplary embodiment.

FIG. 1 shows as an example a bus system 1 that is in particular the basis for the design of a CAN bus system, a CAN FD bus system, a CAN FX bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN FX_H and CAN FX_L, and are used for electrical signal transmission after coupling in the dominant levels or generating recessive levels for a signal in the transmission state. Messages 45, 46 in the form of signals are serially transmittable between individual user stations 10, 20, 30 via bus 40. If an error occurs during the communication on bus 40, as illustrated by the serrated dark block arrow in FIG. 1, an error frame 47 (error flag) may optionally be transmitted. User stations 10, 20, 30 are, for example, control units, sensors, display devices, etc., of a motor vehicle.

As shown in FIG. 1, user station 10 includes a communication control device 11, a transceiver device 12, and a check sum unit 15. User station 20 includes a communication control device 21, a transceiver device 22, and a check sum unit 25. User station 30 includes a communication control device 31, a transceiver device 32, and a check sum unit 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control devices 11, 31 create and read first messages 45, which are modified CAN messages 45, for example. Modified CAN messages 45 are built up based on a CAN FX format, described in greater detail with reference to FIG. 2, and in which particular check sum unit 15, 35 is used. Communication control devices 11, 31 may also be designed to provide a CAN FX message 45 or a CAN FD message 46 for transceiver device 32 or receive it from same, as needed. Particular check sum units 15, 35 may also be used. Communication control devices 11, 31 thus create and read a first message 45 or second message 46, first and second messages 45, 46 differing by their data transmission standard, namely, CAN FX or CAN FD in this case.

Communication control device 21 may be designed as a conventional CAN controller according to ISO 11898-1: 2015, i.e., as a CAN FD-tolerant conventional CAN controller or a CAN FD controller. Communication control device 21 creates and reads second messages 46, for example CAN FD messages 46. CAN FD messages 46 may include 0 to 64 data bytes, which are also transmitted at a much faster data rate than with a conventional CAN message. In particular, communication control device 21 is designed as a conventional CAN FD controller.

Transceiver device 22 may be designed as a conventional CAN transceiver according to ISO 11898-1:2015 or as a CAN FD transceiver. Transceiver devices 12, 32 may be designed to provide messages 45 according to the CAN FX format or messages 46 according to the present CAN FD format for associated communication control device 11, 31 or receive the messages from same, as needed.

A formation and then transmission of messages 45 having the CAN FX format, in addition to the reception of such messages 45, is achievable by use of the two user stations 10, 30.

Figure 2:
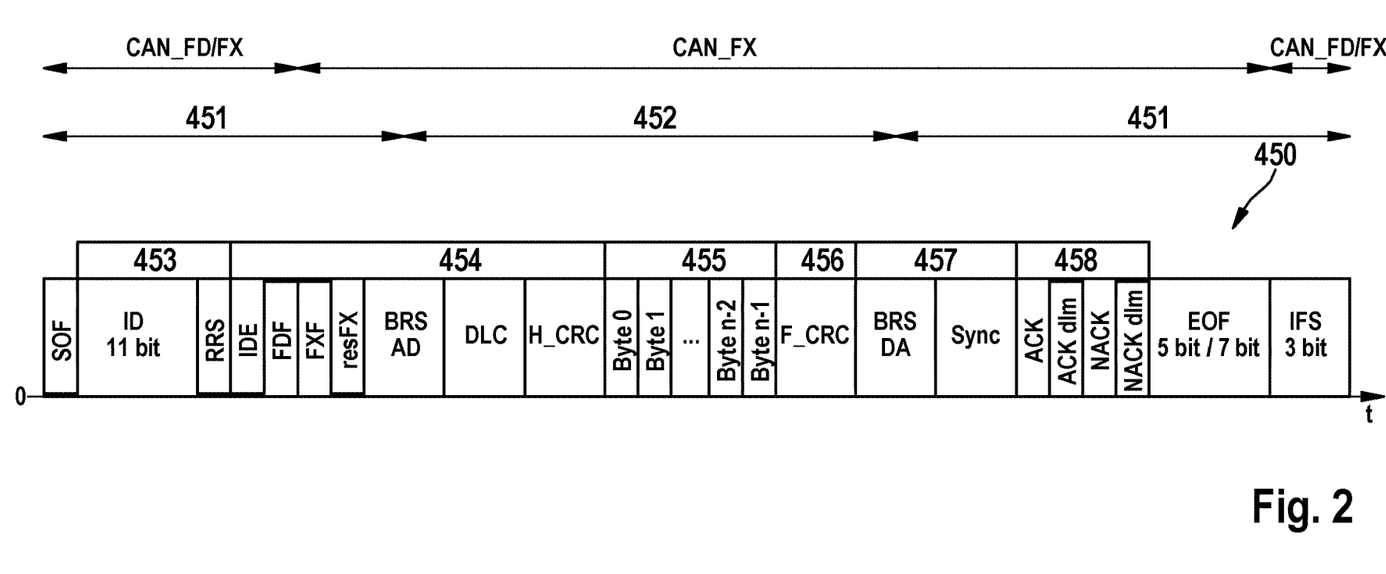
FIG. 2 shows a diagram for illustrating the design of a message that may be transmitted from a user station of the bus system according to the first exemplary embodiment.

FIG. 2 shows for message 45 a CAN FX frame 450, which is provided by communication control device 11 for transceiver device 12 for transmitting onto bus 40. In the present exemplary embodiment, communication control device 11 creates frame 450 so as to be compatible with CAN FD, as also illustrated in FIG. 2. The same analogously applies for communication control device 31 and transceiver device 32 of user station 30.

According to FIG. 2, for the CAN communication on bus 40, CAN FX frame 450 is divided into different communication phases 451, 452, namely, an arbitration phase 451 and a data phase 452. Frame 450 includes an arbitration field 453, a control field 454, a data field 455, a check sum field 456 for a check sum F_CRC, a synchronization field 457, and an acknowledgment field 458.

In arbitration phase 451, with the aid of an identifier ID in arbitration field 453, bitwise negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1. A physical layer, similarly as with CAN and CAN FD, is used at least in arbitration phase 451. The physical layer corresponds to the bit transmission layer or layer 1 of the conventional Open Systems Interconnection (OSI) model.

An important point during phase 451 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

In data phase 452, in addition to a portion of control field 454, the useful data of the CAN FX frame or of message 45 from data field 455, and check sum field 456 for check sum F_CRC, are transmitted.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In general, in the bus system with CAN FX, in comparison to CAN or CAN FD in particular the following differing properties may be achieved:

a) taking over and optionally adapting proven properties that are responsible for the robustness and user-friendliness of CAN and CAN FD, in particular a frame structure including identifiers and arbitration according to the CSMA/CR method, b) increasing the net data transmission rate to approximately 10 megabits per second, c) increasing the quantity of the useful data per frame to approximately 4 kbytes.

As illustrated in FIG. 2, in arbitration phase 451 user station 10 partially uses as the first communication phase, in particular up to and including the FDF bit, a format known from CAN/CAN FD according to ISO 11898-1:2015. In contrast, beginning with the FDF bit in the first communication phase and in the second communication phase (data phase 452), user station 10 uses a CAN FX format, as described below.

In the present exemplary embodiment, CAN FX and CAN FD are compatible. The res bit known from CAN FD, referred to below as the FXF bit, is utilized for switching from the CAN FD format over to the CAN FX format. Therefore, the frame formats of CAN FD and CAN FX are identical up to the res bit. A CAN FX user station, i.e., user stations 10, 30 here, also support(s) CAN FD.

As an alternative to frame 450 shown in FIG. 2, in which an identifier including 11 bits is used, a CAN FX expanded frame format is optionally possible in which an identifier including 29 bits is used. Except for the FDF bit, this is identical to the known CAN FD expanded frame format from ISO 11898-1:2015.

According to FIG. 2, frame 450 from the SOF bit up to and including the FDF bit is identical to the CAN FD base frame format according to ISO 11898-1:2015. Therefore, the structure is not further explained here. Bits illustrated with a thick bar at their lower line in FIG. 2 are transmitted in frame 450 as dominant. Bits illustrated with a thick bar at their upper line in FIG. 2 are transmitted in frame 450 as recessive.

In general, two different stuffing rules are applied in the generation of frame 450. Except for the FXF bit in control field 454, the dynamic bit stuffing rule from CAN FD applies, so that an inverse stuff bit is to be inserted after 5 identical bits in succession. A fixed stuffing rule applies after an FX bit in control field 454, so that a fixed stuff bit is to be inserted after a fixed number of bits. Alternatively, instead of only one stuff bit, 2 or more bits may be inserted as fixed stuff bits.

In frame 450, the FDF bit is directly followed by the FXF bit, which from the position corresponds to the "res bit" in the CAN FD base frame format, as mentioned above. If the FXF bit is transmitted as 1, i.e., recessive, it thus identifies frame 450 as a CAN FX frame. For a CAN FD frame, communication control device 11 sets the FXF bit as 0, i.e., dominant.

In frame 450, the FXF bit is followed by a resFX bit, which is a dominant bit for future use. For frame 450, the resFX bit must be transmitted as 0, i.e., dominant. However, if user station 10 receives a resFX bit as 1, i.e., recessive, receiving user station 10 goes into a protocol exception state, for example, as carried out with a CAN FD message 46 for res=1. The resFX bit could also be defined the opposite way, i.e., that it must be transmitted as 1, i.e., recessive, so that for a dominant resFX bit the receiving user station goes into the protocol exception state.

In frame 450, the FXF bit is followed by a sequence BRS AD, in which a predetermined bit sequence is encoded. This bit sequence allows a simple and reliable switch from the arbitration bit rate of arbitration phase 451 over to the data bit rate of data phase 452. For example, the bit sequence of BRS AD is made up of a recessive arbitration bit followed by a dominant data bit. In this example, the bit rate may be switched over at the edge between the two stated bits.

In frame 450, sequence BRS AD is followed by a DLC field into which data length code DLC, which indicates the number of bytes in data field 455 of frame 450, is inserted. Data length code DLC may assume any value from 1 up to the maximum length of data field 455 or the data field length. If the maximum data field length is in particular 2048 bits, data length code DLC requires 11 bits, under the assumptions that DLC=0 means a data field length that includes 1 byte, and DLC=2047 means a data field length that includes 2048 bytes. Alternatively, data field 455 having the length 0 could be allowed, as with CAN, for example. DLC=0 would encode, for example, the data field length with 0 byte. With 11 bits, for example, the maximum encodable data field length is then $(2^{11})-1=2047$.

In frame 450, the DLC field is followed by a header check sum H_CRC. The header check sum is a check sum for safeguarding the header of frame 450, i.e., all bits from the start of frame 450 including the SOF bit to the start of header check sum H_CRC, including all dynamic, and optionally, fixed, stuff bits up to the start of header check sum H_CRC. The length of header check sum H_CRC, and thus of the check sum polynomial according to cyclic redundancy check CRC, is to be selected corresponding to the desired Hamming distance. For a data length code DLC of 11 bits, the data word to be safeguarded by header check sum H_CRC is longer than 27 bits. Therefore, in order to achieve a Hamming distance of 6, the polynomial of header check sum H_CRC must be at least 13 bits long. The computation of header check sum H_CRC is described in greater detail below.

In frame 450, header check sum H_CRC is followed by data field 455. Data field 455 is made up of 1 to n data bytes, where n is, for example, 2048 bytes or 4096 bytes or some other arbitrary value. Alternatively, a data field length of 0 is possible. The length of data field 455 is encoded in the DLC field, as described above.

In frame 450, data field 455 is followed by a frame check sum F_CRC. Frame check sum F_CRC is made up of the bits of frame check sum F_CRC. The length of frame check sum F_CRC, and thus of the CRC polynomial, is to be selected corresponding to the desired Hamming distance. Frame check sum F_CRC safeguards entire frame 450. Alternatively, only data field 455 is optionally safeguarded with frame check sum F_CRC. The computation of frame check sum F_CRC is described in greater detail below.

In frame 450, frame check sum F_CRC is followed by a sequence BRS DA in which a predetermined bit sequence is encoded. This bit sequence allows a simple and reliable switch from the data bit rate of data phase 452 over to the arbitration bit rate of arbitration phase 451. For example, the bit sequence of BRS DA is made up of a recessive arbitration bit followed by a dominant data bit. In this example, the bit rate may be switched over at the edge between the two stated bits.

In frame 450, sequence BRS DA is followed by a sync field in which a synchronization pattern (sync pattern) is kept. The synchronization pattern is a bit pattern that allows a receiving user station 10, 30 to detect the start of arbitration phase 451 after data phase 452. The synchronization pattern allows receiving user station 10, 30, which cannot detect the correct length of data field 455, for example due to an erroneous header check sum H_CRC, to synchronize. These user stations may subsequently transmit a "negative acknowledge" in order to communicate the incorrect reception. This is very important in particular when CAN FX no longer allows error frames 47 (error flags) in data field 455.

In frame 450, the sync field is followed by an acknowledgment (ACK) field made up of multiple bits, namely, in the example of FIG. 2, an ACK bit, an ACK dlm bit, a NACK bit, and a NACK dlm bit. The NACK bit and the NACK dlm bit are optional bits. Receiving user stations 10, 30 transmit the ACK bit as dominant when they have correctly received frame 450. The transmitting user station transmits the ACK bit as recessive. Therefore, the bit in frame 450 originally transmitted onto bus 40 may be overwritten by receiving user stations 10, 30. The ACK dlm bit is transmitted as a recessive bit, which is used for separation from other fields. The NACK bit and the NACK dlm bit are used so that a receiving user station may signal an incorrect reception of frame 450 on bus 40. The function of the bits is the same as that of the ACK bit and the ACK dlm bit.

In frame 450, the acknowledgment (ACK) field is followed by an end field (end of frame (EOF)). The bit sequence of end field EOF is used to denote the end of frame 450. End field EOF ensures that 8 recessive bits are transmitted at the end of frame 450. This is a bit sequence that cannot occur within frame 450. As a result, the end of frame 450 may be reliably detected by user stations 10, 20, 30.

End field EOF has a length that is different, depending on whether a dominant bit or a recessive bit has been observed in the NACK bit. If the transmitting user station has received the NACK bit as dominant, end field EOF includes 7 recessive bits. Otherwise, end field EOF is only 5 recessive bits long.

In frame 450, end field EOF is followed by an interframe space IFS. This interframe space IFS is designed according to ISO 11898-1:2015, as with CAN FD.

Figure 3:
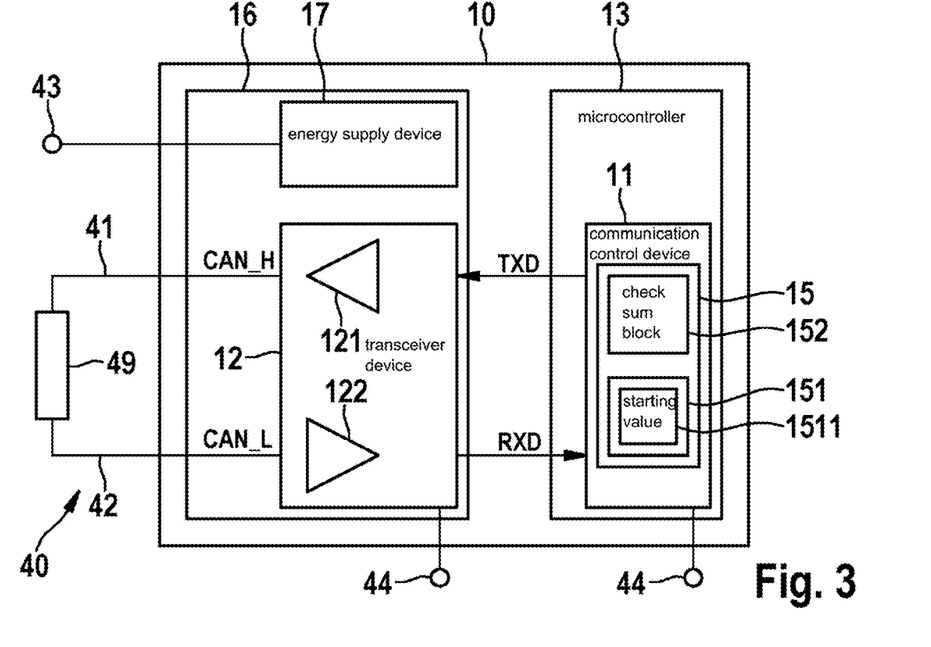
FIG. 3 shows a simplified schematic block diagram of a user station of the bus system according to the first exemplary embodiment.

FIG. 3 shows the basic design of user station 10 together with communication control device 11, transceiver device 12, and check sum unit 15, which is part of communication control device 11. User station 30 has a design similar to that shown in FIG. 3, except that check sum unit 35 according to FIG. 1 is situated separately from communication control device 31 and transceiver device 32. Therefore, user station 30 is not separately described.

According to FIG. 3, in addition to communication control device 11 and transceiver device 12, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V, as needed. Additionally or alternatively, energy supply device 17 may be designed as a power source.

Check sum unit 15 includes a header check sum block 151 and a frame check sum block 152, described in greater detail below. A starting value 1511 is at least temporarily stored in header check sum block 151.

Transceiver device 12 also includes a transmitter 121 and a receiver 122. Even though transceiver device 12 is consistently referred to below, it is alternatively possible to provide receiver 122 in a separate device externally from transmitter 121. Transmitter 121 and receiver 122 may be designed as a conventional transceiver device 22. Transmitter 121 may in particular include at least one operational amplifier and/or one transistor. Receiver 122 may in particular include at least one operational amplifier and/or one transistor.

Transceiver device 12 is connected to bus 40, or more precisely, to its first bus wire 41 for CAN_H or CAN FX_H and its second bus wire 42 for CAN_L or CAN FX_L. The supplying of voltage for energy supply device 17 for supplying first and second bus wires 41, 42 with electrical energy, in particular with voltage CAN_Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmitter 121 and to receiver 122, even though the connection in FIG. 3 is not shown for simplification.

During operation of bus system 1, transmitter 121 converts a transmission signal TXD or TxD of communication control device 11 into corresponding signals CAN FX_H and CAN FX_L for bus wires 41, 42, and transmits these signals CAN FX_H and CAN FX_L onto bus 40 at the terminals for CAN_H and CAN_L.

Figure 4:
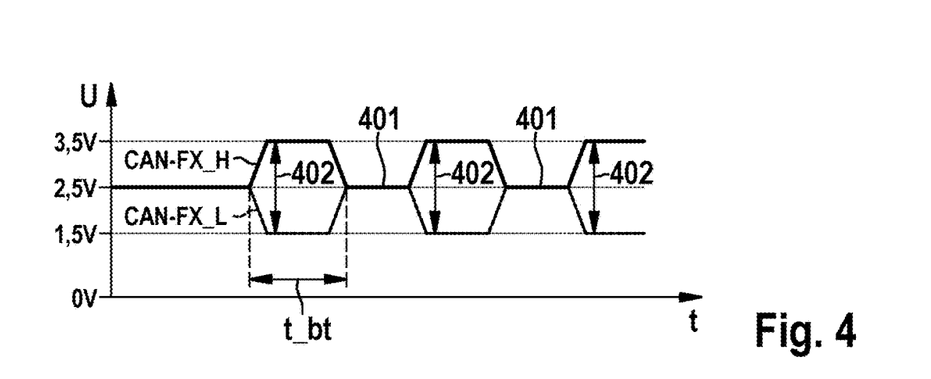
FIG. 4 shows a temporal profile of bus signals CAN FX_H and CAN FX_L for the user station according to the first exemplary embodiment.

According to FIG. 4, receiver 122 forms a reception signal RXD or RxD from signals CAN FX_H and CAN FX_L that are received from bus 40, and passes it on to communication control device 11, as shown in FIG. 3. With the exception of an idle or standby state, transceiver device 12 with receiver 122 during normal operation always listens to a transmission of data or messages 45, 46 on bus 40, in particular regardless of whether or not transceiver device 12 is the sender of message 45.

Figure 5:
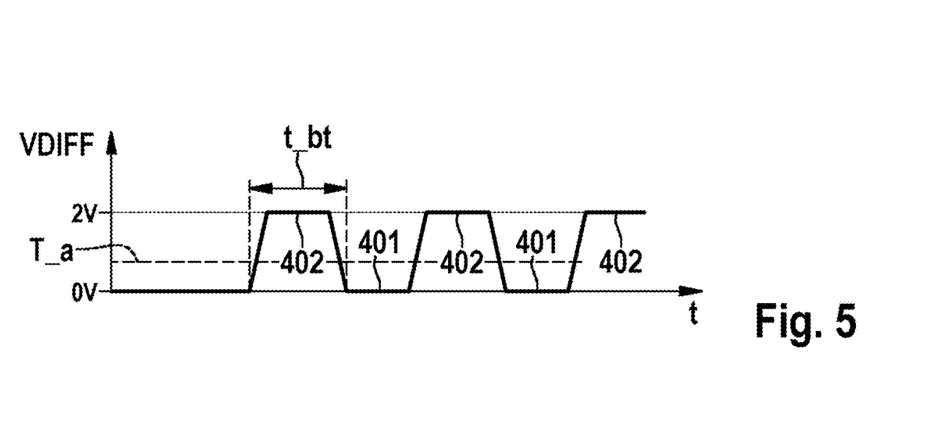
FIG. 5 shows a temporal profile of a differential voltage VDIFF of bus signals CAN FX_H and CAN FX_L for the user station according to the first exemplary embodiment.

According to the example from FIG. 4, signals CAN FX_H and CAN FX_L, at least in arbitration phase 451, include dominant and recessive bus levels 401, 402, as known from CAN. A difference signal VDIFF=CAN FX_H−CAN FX_L, shown in FIG. 5, is formed on bus 40. The individual bits of signal VDIFF with bit time t_bt may be recognized using a reception threshold of 0.7 V. In data phase 452 the bits of signals CAN FX_H and CAN FX_L are transmitted more quickly, i.e., with a shorter bit time t_bt, than in arbitration phase 451. Thus, signals CAN FX_H and CAN FX_L in data phase 452 differ from conventional signals CAN_H and CAN_L, at least in their faster bit rate.

The sequence of states 401, 402 for signals CAN FX_H, CAN FX_L in FIG. 4 and the resulting pattern of voltage VDIFF from FIG. 5 are used only for illustrating the function of user station 10. The sequence of data states for bus states 401, 402 is selectable as needed.

In other words, transmitter 121 in a first operating mode according to FIG. 4 generates a first data state as bus state 402 with different bus levels for two bus wires 41, 42 of the bus line, and a second data state as bus state 401 with the same bus level for the two bus wires 41, 42 of the bus line of bus 40.

In addition, transmitter 121 transmits the bits onto bus 40 at a higher bit rate for the temporal profiles of signals CAN FX_H, CAN FX_L in a second operating mode, which includes data phase 452. CAN FX_H and CAN FX_L signals may also be generated in data phase 452 with a different physical layer than with CAN FD. The bit rate in data phase 452 may thus be increased even further than with CAN FD.

Check sum unit 15 from FIG. 3, in particular its header check sum block 151, is used to compute and evaluate the check sum in the field for header check sum H_CRC. In addition, check sum unit 15, in particular its frame check sum block 152, is used to compute and evaluate the check sum in the field for frame check sum F_CRC.

As mentioned above, a check sum for safeguarding the header of frame 450 is formed, i.e., all bits from the start of frame 450 including the SOF bit to the start of header check sum H_CRC, including all dynamic, and optionally, fixed, stuff bits up to the start of header check sum H_CRC.

In the present exemplary embodiment, communication control device 11, in particular its check sum unit 15 or header check sum block 151, takes precautions in computing header check sum H_CRC in order to eliminate an error referred to as type B. Such an error may occur due to the dynamic stuff bits, which may occur up to the FXF bit of frame 450. The error occurs when stuff bits are erroneously inserted or removed due to error synchronizations caused by "glitches," while the instantaneous intermediate result of check sum CRC has the value 0.

Communication control device 11, in particular its check sum unit 15 or header check sum block 151, therefore selects the starting value for computing header check sum H_CRC in such a way that not all bits of the CRC generator register can be at "0" while a bit sequence without detected stuff errors up to the FXF bit is being processed. Thus, the temporary value of the computation of header check sum H_CRC up to the processing of the FXF bit cannot become 0 . . . 0. The starting value is thus to be set to a particular value, but not to 0 . . . 0, so that no 0 . . . 0 value occurs in header check sum H_CRC up to the FDF bit.

In determining the starting value for computing header check sum H_CRC, communication control device 11, in particular its check sum unit 15 or header check sum block 151, takes into account that a CAN FX user station 10, 30 cannot transmit any arbitrary bit sequence up to the FXF bit. Communication control device 11, in particular its check sum unit 15 or header check sum block 151, therefore determines the starting value under the following boundary conditions, namely, that no more than five dominant bits or five recessive bits may be transmitted in succession by the dynamic stuff bits, and that certain bits of frame 450 have a fixed value, as described above, and therefore are not variable.

The predetermined starting value may thus be dynamically configured by communication control device 11, in particular with the aid of software in check sum unit 15 or header check sum block 151.

Alternatively, the predetermined starting value may be permanently stored in communication control device 11 once the starting value has been determined, either by communication control device 11 or some other device. Alternatively, the predetermined starting value may be selected by an operator under the condition that the starting value is not equal to 0 . . . 0.

Thus, a type B error can no longer occur in user station 10.

The major advantage of the described procedure for computing the starting value is that no additional bits are introduced into frame 450. The data overhead of frame 450 and the complexity of evaluating frame 450 are thus reduced.

In addition, it might be necessary to increase the length of header check sum H_CRC and thus the order of the CRC polynomial to allow an appropriate H_CRC starting value to be found. Header check sum H_CRC would thus be longer than would be necessary for detecting a certain number of normal bit flips, in which the bit state inadvertently changes due to an error.

Furthermore, for frame 450, which uses an identifier ID including 11 bits, communication control device 11, in particular its check sum unit 15 or header check sum block 151, could use a different polynomial for header check sum H_CRC than for frame 450, which uses an identifier ID including 29 bits. This has the advantage that the data overhead due to header check sum H_CRC for frame 450, which uses an identifier ID including 11 bits, is smaller than for frame 450, which uses an identifier ID including 29 bits.

Check sum unit 15, in particular its frame check sum block 152, also forms frame check sum F_CRC, as mentioned above. Check sum unit 15 may apply one of the stated options. According to the following options 1 and 2, frame check sum F_CRC in each case safeguards entire frame 450 up to frame check sum F_CRC.

Option 1: Frame check sum F_CRC is computed across entire frame 450. Thus, all bits beginning with and including the SOF bit up to the start of frame check sum F_CRC are included in the computation of frame check sum F_CRC. In addition, the dynamic stuff bits and optionally also the fixed stuff bits are included in the computation. Since header check sum H_CRC already safeguards the header of frame 450 against the type B errors, frame check sum F_CRC does not have to do this again.

Option 2: Frame check sum F_CRC is computed across header check sum H_CRC and data field 455. Thus, all bits beginning with and including the first bit of header check sum H_CRC are included in the computation of frame check sum F_CRC. The fixed stuff bits are also optionally included in the computation. Since header check sum H_CRC already safeguards the header of frame 450, it is sufficient to include header check sum H_CRC in the F_CRC computation in order to safeguard entire frame 450.

Option 3: Frame check sum F_CRC safeguards only data field 455. Thus, all bits beginning with the first bit after header check sum H_CRC up to the start of frame check sum F_CRC are included in the computation of frame check sum F_CRC. The fixed stuff bits are also optionally included in the computation. Thus, frame check sum F_CRC safeguards only data field 455. This is sufficient due to the fact that header check sum H_CRC already safeguards the header of frame 450. Frame check sum F_CRC and header check sum H_CRC together safeguard complete frame 450.

Figure 6:
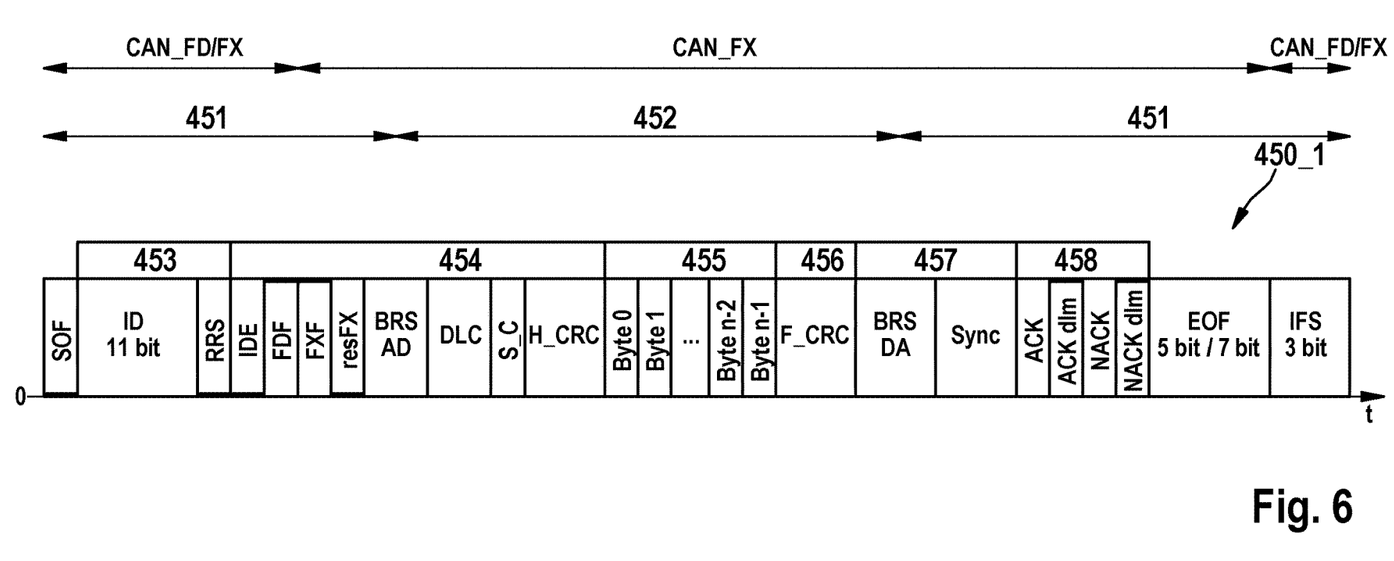
FIG. 6 shows a diagram for illustrating the design of a message that may be transmitted from a user station of the bus system according to a second exemplary embodiment.

FIG. 6 shows a frame 450_1 according to a second exemplary embodiment in which CAN FX and CAN FD are compatible. In this exemplary embodiment, frame 450_1 and thus the CAN FX frame format are different from frame 450 from FIG. 2, as described below. Only the differences from frame 450 from FIG. 6 are described. In other respects, frames 450, 450_1 of the two exemplary embodiments are the same.

An S_C field is inserted into frame 450_1 prior to header check sum H_CRC. The number of transmitted dynamic stuff bits (stuff count) is transmitted in the S_C field. The S_C field may include 1 to n bits. In this case, i.e., for frame 450_1, a maximum of 3 dynamic stuff bits occur: i.e., n may be selected as 2. Alternatively, the transmission of "number of dynamic stuff bits modulo X" is possible in order to reduce the number of bits to be transmitted. X may be 2, for example.

However, due to this variant the data overhead of frame 450_1 is greater in comparison to frame 450 from FIG. 2.

In one modification of frame 450_1, instead of the number of transmitted dynamic stuff bits (stuff count) a stuff compensator is inserted into the S_C field. The stuff compensator includes 0 to m bits, where m corresponds to the maximum number of dynamic stuff bits that may occur up to the FDF bit. The sum of dynamic stuff bits and stuff compensator bits is always equal to m.

The stuff compensator ensures that the length of the frame header of frame 450_1 is constant. For example, in the case of 11 bits for identifier ID, a maximum of three dynamic stuff bits may occur. Thus, m=3 would result for an identifier ID including 11 bits. In a frame 450_1 including one dynamic stuff bit, the stuff compensator is 2 bits long, since 3−1=2 bits applies. Data field 455 thus always begins after a fixed number of bits after the start of the frame.

Figure 7:
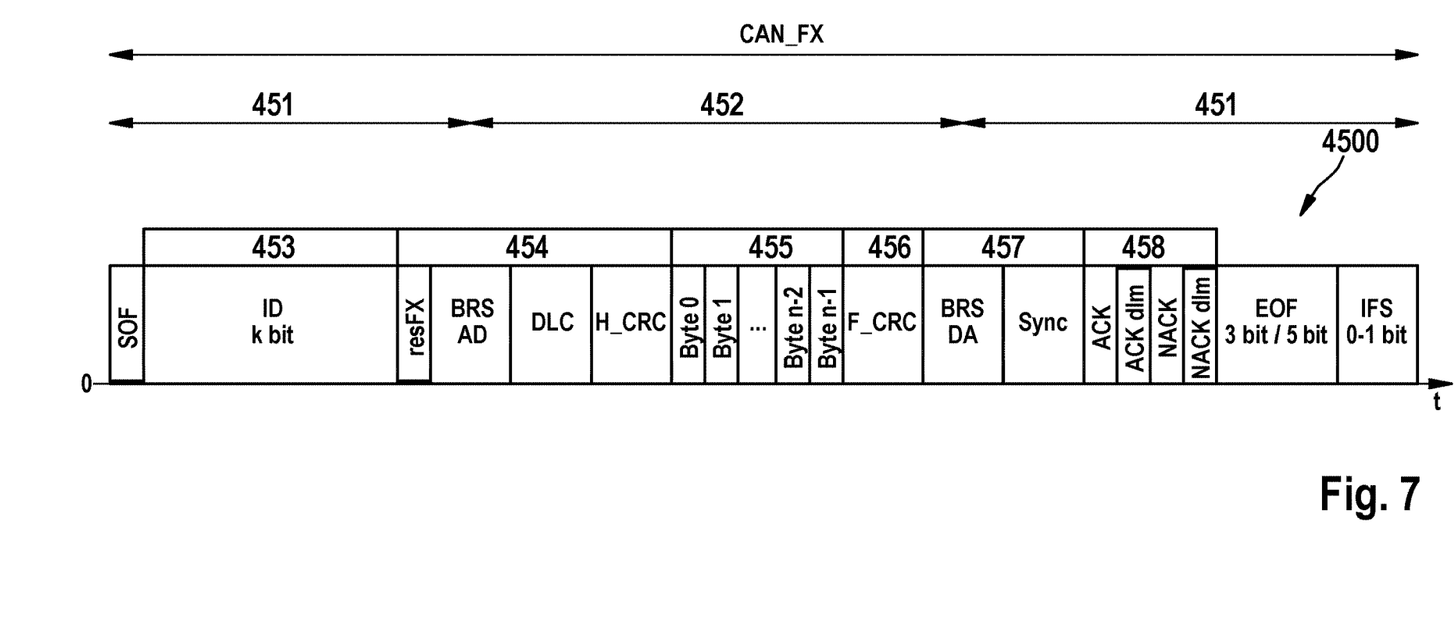
FIG. 7 shows a diagram for illustrating the design of a message that may be transmitted from a user station of the bus system according to a third exemplary embodiment.

FIG. 7 shows a frame 4500 according to a third exemplary embodiment in which CAN FX and CAN FD are not compatible. In this exemplary embodiment, frame 4500 and thus the CAN FX frame format are different from frame 450 from FIG. 2, as described below. Only the differences from frame 450 from FIG. 2 are described. In other respects, frames 450, 4500 of the two exemplary embodiments are the same.

In general, when creating frame 4500 according to the present exemplary embodiment only the fixed stuffing rule is used, so that a fixed stuff bit is to be inserted after a fixed number of bits. Alternatively, instead of only one stuff bit, 2 or more bits may also be inserted as fixed stuff bits. For a known value of data length code DLC, this results in a constant frame length or a constant length of frame 4500. This prevents various problems that are caused by dynamic stuff bits.

In frame 4500 according to the present exemplary embodiment, identifier ID is no longer limited to 11 bits or 29 bits as with CAN FD. Number k of the bits of identifier ID may be freely selected. However, number k is alternatively settable to a fixed value. For a high net data rate, an ID including k=8 bits is meaningful. This is sufficient to give each user station 10, 20, 30 of bus system 1 an adequate number of bus access priorities. Of course, some other value of k is selectable, depending on the need and the number of various priorities in bus system 1.

Bits RRS, IDE, FDF, FXF of frame 450 from FIG. 2 are no longer necessary in frame 4500 and are omitted. This saves 4 bits, so that the frame overhead is reduced. The net data rate in bus system 1 is thus increased.

End field EOF includes only 5 bits in frame 4500 when the NACK bit is dominant. In contrast, if the NACK bit is recessive, end field EOF includes 3 bits. This ensures that 6 recessive bits are transmitted at the end of frame 4500. This number of recessive bits cannot occur at any other location in a valid frame 4500 when a fixed stuff bit is inserted after 5 identical bits in arbitration phase 451. Alternatively, there could be more than 6 bits. In particular, the number of EOF bits must be adapted to the number of bits after which a fixed stuff bit is inserted.

Interframe space IFS does not require a minimum length in frame 4500. In particular, interframe space IFS may have the length 0. In such a case, two frames 4500 are seamlessly transmitted in succession. However, an interframe space IFS that includes 1 bit, for example, is also meaningful in order to increase the robustness of bus system 1 in comparison to the previously stated case. Due to the now 7 recessive bits between two frames 4500, a new user station at bus 40 may synchronize more reliably.

Thus, no dynamic stuff bits occur for frame 4500. As a result, it is not necessary to provide protection from the error type B described above. Therefore, field S_C from FIG. 6, used to detect error type B, is not required, so that the frame overhead is even further reduced. Header check sum H_CRC may optionally also be dispensed with, so that the frame overhead is even further reduced. This increases the net data rate in bus system 1 even more.

For frame 4500, frame check sum F_CRC may thus be computed according to one of options 1 through 3, as described with regard to the first exemplary embodiment, in which CAN FD compatibility is present.

All of the above-described embodiments of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may also be a communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or more of user stations 10 or 30 to be present in bus system 1. It is possible for all user stations in bus system 1 to have the same design, i.e., for only user station 10 or only user station 30 to be present.

The present invention described above may be further refined with regard to the introduction of different identifiers, as explained below and illustrated in FIG. 8.

The terms "message" and "frame" are used synonymously in the description.

Figure 8:
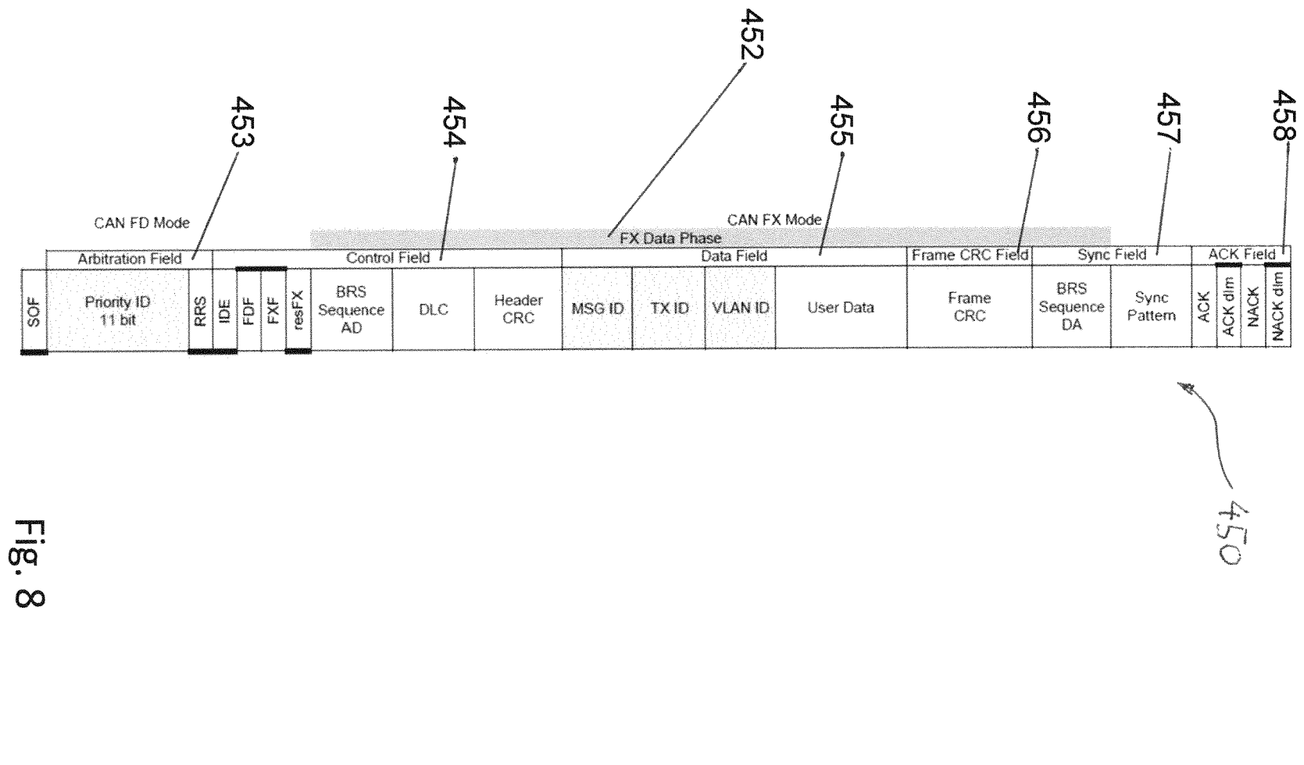
FIG. 8 shows a diagram for illustrating a further aspect of the present invention, namely, the introduction of multiple identifiers into the CAN FX frame.

FIG. 8 illustrates the refinement using different identifiers, starting from the frame format from FIG. 2. The refinement using different identifiers may be correspondingly applied in a manner completely analogous to the frame formats illustrated in FIG. 6 or FIG. 7.

Multiple identifiers are introduced into the CAN FX frame:

Priority ID:

The priority ID replaces or corresponds to identifier ID, already described, in arbitration field 453 of the messages or frames 450, 450_1, or 4500. The priority ID is preferentially used for the priority of the bus access in the course of the arbitration.

MSG ID:

Message identification MSG ID, which may be transmitted in data field 455, identifies the content of the message or the frame. Message identification MSG ID is optional.

TX ID:

Sender identification TX ID, which may be transmitted in data field 455, identifies the sender of the message or the frame. Sender identification TX ID is optional.

VLAN ID:

Virtual network identification VLAN ID, which may be transmitted in data field 455, contains forwarding information for the message or the frame. Virtual network identification VLAN ID is optional.

Advantages:

The stated introduction of multiple identifications has the following advantages over the conventional identifier with CAN FD:

Each of the listed identifications has the optimal length in order to optimally fulfill the required identification or function. At the same time, a high net data rate is achieved, on the one hand because only those bits that are absolutely necessary for the arbitration are transmitted in the slow arbitration phase, and on the other hand, because only those optional identification types (MSG ID, TX ID, VLAN ID) that are required for the particular application may be used.

The order of optional identifications MSG ID, TX ID, and VLAN ID within the data field may also be selected differently from the order indicated above and illustrated in FIG. 8.

Description of the portions of the frame in FIG. 8 that are relevant for this aspect of the present invention:

Priority ID

This ID corresponds to the frame ID for CAN FD.

For CAN FX it is referred to as "priority ID" due to the fact that it primarily indicates the bus access priority. The higher the priority, the earlier a frame wins the arbitration at the bus.

In the example illustrated in FIG. 8, the CAN FX frame is compatible with the CAN FD frame. This limits the length of the priority ID to 11 or 29 bits. For a CAN FX frame that is not compatible with CAN FD, the priority ID could have an arbitrary length, for example 5 bits, in order to generate a particularly low overhead. This has already been explained in conjunction with the exemplary embodiments from FIGS. 2 and 7.

DLC: data length code

Data length code DLC indicates the number of bytes in the data field (corresponding to data field 455 of the illustrations in FIGS. 2, 6, and 7).

There are now two alternatives for use of the DLC:

A) Optional identifications MSG ID, TX ID, and VLAN ID in the data field may be part of the data field; i.e., the DLC indicates the length of the data field including optional identifications MSG ID, TX ID, and VLAN ID in the data field. In other words, the first bytes of the data field contain the IDs. This case is illustrated in FIG. 8. However, this does not necessarily have to be the first bytes. In this case, the application must have knowledge of which identifications IDs are present in the data field and what length they have.

B) Optional identifications MSG ID, TX ID, and VLAN ID are not considered as part of the data field, and the DLC indicates the length of the user data without optional identifications MSG ID, TX ID, and VLAN ID.

Which of the optional identifications MSG ID, TX ID, and VLAN ID are present in a frame and what length they have may then be indicated by configuring the communication control device.

Additional identifiers (as part of the data field or separate)

MSG ID

The message ID identifies the content of the message or the frame. With the aid of this ID, a reception node may detect what information is in this frame. For example, MSG ID=0x10 stands for the vehicle speed.

This ID is optional; i.e., it may also have the length 0.

The length of the ID is ideally settable in a bitwise manner in the communication control device. For example, 16 bits would be a possible value for the length.

TX ID

The TX ID identifies the sender of the message or the frame. This means that each transmission node uses one (or multiple) exclusively assigned ID(s), and inserts it/them into the frame during the transmission.

This ID is optional; i.e., it may also have the length 0.

The length of the ID is ideally settable in a bitwise manner in the communication control device. For example, 8 bits would be a possible value for the length.

VLAN ID

The VLAN ID identifies the subnetwork in which this message or this frame is to be visible, or in which this message or this frame is to be relayed. For example, a gateway may evaluate this VLAN ID and derive therefrom in which other networks this message or this frame is to be relayed.

This ID is optional; i.e., it may also have the length 0.

The length of the ID is ideally settable in a bitwise manner in the communication control device. For example, 4 bits would be a possible value for the length.

Application of the various identifiers:

Priority ID

Each bus user (hereinafter also "node") is exclusively assigned at least one dedicated priority ID.

Each node ideally is exclusively assigned up to K priority IDs. The up to K priority IDs allow up to K different priorities (priority classes) to be defined. Each message/each frame that transmits a node obtains a priority ID that corresponds to the priority of the message/the frame.

An example of a bus system that includes 4 nodes and a maximum of K=3 priority IDs per node:

| | Priority IDs | | | |
|---|---|---|---|---|
| | High priority | Medium priority | Low priority | Comment |
| Node 1 | 10 | 20 | 60 | |
| Node 2 | 11 | 21 | 61 | |
| Node 3 | 12 | 22 | 62 | |
| Node 4 | Not assigned | 23 | 63 | This node transmits no high-priority messages, and therefore has no priority ID of the class "high priority" |

Each node optionally obtains multiple priority IDs in a priority class. This means, for example, that node 1 for the "medium priority" obtains priority IDs 20, 24, 28, and node 2 obtains priority IDs 21, 25, 29. If each node in a priority class now selects the IDs according to a certain rule or randomly, for example according to a "round robin" process, for example, node 1 then is not continuously superior to node 2 in the middle priority class; i.e., node 1 does not always have a higher priority. Fairness is thus achieved within a priority class.

Optionally, if a message or a frame has already lost the arbitration multiple times, according to a certain rule the priority ID for this message or this frame is also exchanged for a priority ID with higher priority, so that the message has a better chance of winning the arbitration. In other words, this means that the association of a priority ID with messages may take place dynamically.

MSG ID

Each piece of information to be transmitted via the bus system is assigned one or multiple MSG IDs.

The MSG ID does not have to be exclusive for each node. However, a certain MSG ID cannot be used for different pieces of information.

If the MSG ID is exclusively assigned for a node, in principle an application for the transmission of the TX ID may then be dispensed with, since the MSG ID also implicitly identifies the sender.

TX ID

Each node is assigned at least one TX ID that is unambiguous for the node. Two different nodes cannot receive the same TX ID.

The or a TX ID assigned to the node is inserted into the message.

VLAN ID

With the VLAN ID, the transmission node determines in which further connected networks the particular message is to be relayed. Also, for example, a certain VLAN ID, such as the VLAN ID of the value 0, could also mean a broadcast, i.e., a relay into all connected networks.

What is claimed is:

1. A user station for a serial bus system, comprising:
a communication control device to control a communication of the user station with at least one other user station of the bus system; and
a transceiver device to transmit a transmission signal, generated by the communication control device, onto a bus of the bus system, so that for a message that is exchanged between user stations of the bus system, a bit time of a signal transmitted onto the bus in a first communication phase is different from a bit time of a signal transmitted in a second communication phase;
wherein the communication control device is configured to generate the transmission signal according to a frame in which a field for a header check sum and a field for a frame check sum are provided, the communication control device being configured to provide an identifier in the frame which indicates a priority for transmitting the exchanged message onto the bus, and the communication control device being configured to provide at least one further identifier in the frame, the at least one further identifier, as a message identification, indicating content of data in a data field of the exchanged message, or as a sender identification, indicating a transmitting user station for the exchanged message, or as a virtual network identification, indicating a piece of forwarding information for the exchanged message.

2. The user station as recited in claim 1, wherein the at least one further identifier is part of the data field, and a data length code indicates a length of the data field, taking into account a length of the at least one further identifier.

3. The user station as recited in claim 1, wherein the at least one further identifier is not part of the data field, and a data length code indicates a length of the data field without taking into account a length of the at least one further identifier.

4. The user station as recited in claim 1, wherein a length of the message identification or a length of the sender identification or a length of the virtual network identification is settable in a bitwise manner in the communication control device.

5. The user station as recited in claim 1, wherein the frame that is formed for the message is compatible with CAN FD.

6. The user station as recited in claim 1, wherein in the first communication phase, it is negotiated which of the user stations of the bus system in a subsequent second communication phase obtains, at least temporarily, exclusive, collision-free access to the bus.

7. A method for communicating in a serial bus system, the method being carried out using a user station of the bus system that includes a communication control device and a transceiver device, the method comprising:
controlling, via the communication control device, a communication of the user station with at least one other user station of the bus system; and
transmitting, via the transceiver device, a transmission signal, generated by the communication control device, onto a bus of the bus system, so that for a message that is exchanged between user stations of the bus system, a bit time of a signal that is transmitted onto the bus in a first communication phase is different from a bit time of a signal that is transmitted in a second communication phase, the communication control device generating the transmission signal according to a frame in which a field for a header check sum and a field for a frame check sum are provided, the communication control device providing an identifier in the frame which indicates a priority for transmitting the exchanged message onto the bus, and the communication control device providing at least one further identifier in the frame, the at least one further identifier, as a message identification, indicating a content of data in a data field of the exchanged message, or as a sender identification, indicating the transmitting user station for the exchanged message, or as a virtual network identification, indicating a piece of forwarding information for the exchanged message.

8. The method as recited in claim 7, wherein the at least one further identifier is part of the data field, and a data length code indicates a length of the data field, taking into account a length of the at least one further identifier.

9. The method as recited in claim 7, wherein the at least one further identifier is not part of the data field, and a data length code indicates a length of the data field without taking into account a length of the at least one further identifier.

10. The method as recited in claim 7, wherein a length of the message identification or a length of the sender identification or a length of the virtual network identification is settable in a bitwise manner in the communication control device.

11. The method as recited in claim 7, wherein the frame that is formed for the message is compatible with CAN FD.

12. The method as recited in claim 7, wherein in the first communication phase, it is negotiated which of the user stations of the bus system in a subsequent second communication phase obtains, at least temporarily, exclusive, collision-free access to the bus.

* * * * *